(12) United States Patent
Tsujikawa et al.

(10) Patent No.: US 12,710,435 B2
(45) Date of Patent: Aug. 18, 2026

(54) AUTOMATIC ANALYZER

(71) Applicant: Hitachi High-Tech Corporation, Tokyo (JP)

(72) Inventors: Masaki Tsujikawa, Tokyo (JP); Yoshiyuki Tanaka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 550 days.

(21) Appl. No.: 18/271,494

(22) PCT Filed: Nov. 25, 2021

(86) PCT No.: PCT/JP2021/043111
§ 371 (c)(1),
(2) Date: Jul. 10, 2023

(87) PCT Pub. No.: WO2022/201637
PCT Pub. Date: Sep. 29, 2022

(65) Prior Publication Data

US 2024/0069045 A1 Feb. 29, 2024

(30) Foreign Application Priority Data

Mar. 24, 2021 (JP) ................................ 2021-049452

(51) Int. Cl.
*G01N 35/00* (2006.01)
*G01N 35/02* (2006.01)

(52) U.S. Cl.
CPC . *G01N 35/00613* (2013.01); *G01N 35/00732* (2013.01); *G01N 35/026* (2013.01);
(Continued)

(58) Field of Classification Search
CPC ....... G01N 35/00613; G01N 35/00732; G01N 35/026; G01N 2035/00445;
(Continued)

(56) References Cited

U.S. PATENT DOCUMENTS 6,080,364 A 6/2000 Mimura et al.
6,579,717 B1 6/2003 Matsubara et al.
(Continued)

FOREIGN PATENT DOCUMENTS

JP 10-339732 A 12/1998
JP 3727481 B2 12/2005
(Continued)

OTHER PUBLICATIONS

Extended European Search Report received in corresponding European Application No. 21933235.0 dated Jan. 15, 2025.

(Continued)

*Primary Examiner* — Jennifer Wecker
*Assistant Examiner* — Britney N. Washington
(74) *Attorney, Agent, or Firm* — MATTINGLY & MALUR, PC

(57) ABSTRACT

To provide an automatic analyzer with no need to control a residual amount of a quality control sample. An automatic analyzer includes an input unit which receives a container including a specimen and a quality control sample, an ID reader which reads ID attached to the container, a control unit which assigns measurement items to the ID and controls each unit, and an analysis unit which dispenses the specimen and the quality control sample from the container and performs analysis based on the measurement items, in which when a liquid amount of a first container including the quality control sample is not enough, the control unit assigns measurement items not yet performed, of measurement items assigned to ID of the first container, to ID of a second container including the quality control sample and controls the analysis unit to perform analysis.

6 Claims, 3 Drawing Sheets

(52) U.S. Cl.
CPC .............. *G01N 2035/00445* (2013.01); *G01N 2035/00801* (2013.01)

(58) Field of Classification Search
CPC ... G01N 2035/00801; G01N 35/00663; G01N 2035/1025
See application file for complete search history.

(56) References Cited

U.S. PATENT DOCUMENTS

| | | | | |
|---|---|---|---|---|
| 2006/0110288 | A1* | 5/2006 | Mimura | G01N 35/026 422/63 |
| 2008/0056944 | A1* | 3/2008 | Nakamura | G01N 35/00712 422/67 |
| 2014/0038298 | A1* | 2/2014 | Yu | G01N 35/0092 422/65 |

FOREIGN PATENT DOCUMENTS

| | | | |
|---|---|---|---|
| JP | 2006-053164 | A | 2/2006 |
| JP | 2007-240223 | A | 9/2007 |
| JP | 2009-281988 | A | 12/2009 |

OTHER PUBLICATIONS

International Search Report of PCT/JP2021/043111 dated Jan. 11, 2022.

* cited by examiner

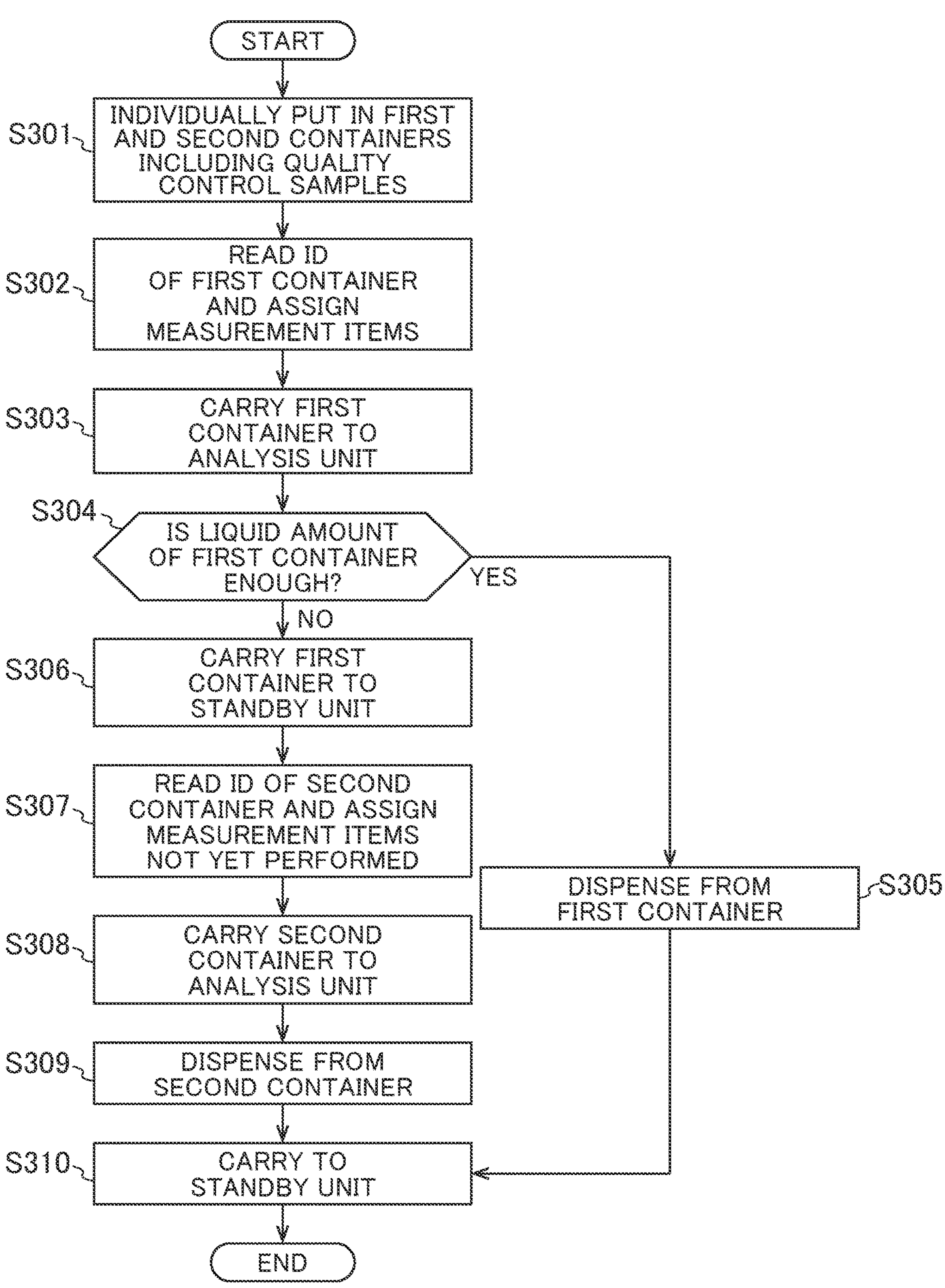
FIG.3
START
S301
INDIVIDUALLY PUT IN FIRST AND SECOND CONTAINERS INCLUDING QUALITY CONTROL SAMPLES
S302
READ ID OF FIRST CONTAINER AND ASSIGN MEASUREMENT ITEMS
S303
CARRY FIRST CONTAINER TO ANALYSIS UNIT
S304
IS LIQUID AMOUNT OF FIRST CONTAINER ENOUGH?
YES
NO
S306
CARRY FIRST CONTAINER TO STANDBY UNIT
S307
READ ID OF SECOND CONTAINER AND ASSIGN MEASUREMENT ITEMS NOT YET PERFORMED
S305
DISPENSE FROM FIRST CONTAINER
S308
CARRY SECOND CONTAINER TO ANALYSIS UNIT
S309
DISPENSE FROM SECOND CONTAINER
S310
CARRY TO STANDBY UNIT
END

AUTOMATIC ANALYZER

TECHNICAL FIELD

The present invention relates to an automatic analyzer.

BACKGROUND ART

An automatic analyzer is a device that automatically performs qualitative or quantitative analysis on a specific component contained in a specimen such as blood or urine. In the automatic analyzer, to maintain an analysis precision, a quality control sample that is a sample having a known concentration is measured a plurality of times, and it is checked whether an average value or a standard deviation of measured values is within an allowable range. The measurement of the quality control sample is periodically performed, and therefore control of a residual amount of the quality control sample is important.

PTL 1 discloses an automatic analyzer that stores a measurable number of times of a quality control sample to automatically perform residual amount control of the quality control sample, compares the stored measurable number of times with a requested number of times of measurement, and displays a difference therebetween.

CITATION LIST

Patent Literature

PTL 1: JP3727481B

SUMMARY OF INVENTION

Technical Problem

However, in PTL 1, since the residual amount control of the quality control sample is performed for each automatic analyzer, when the quality control sample is shared by a plurality of automatic analyzers, an error occurs between the measurable number of times stored for each automatic analyzer and the actually measurable number of times, and the quality control sample may not be measured.

Therefore, an object of the invention is to provide an automatic analyzer with no need to control a residual amount of a quality control sample.

Solution to Problem

In order to achieve the object, the invention provides an automatic analyzer including: an input unit which receives a container including a specimen and a quality control sample; an ID reader which reads ID attached to the container; a control unit which assigns measurement items to the ID and controls each unit; and an analysis unit which dispenses the specimen and the quality control sample from the container and performs analysis, based on the measurement items, in which when a liquid amount of a first container including the quality control sample is not enough, the control unit assigns measurement items not yet performed, of measurement items assigned to ID of the first container, to ID of a second container including the quality control sample and controls the analysis unit to perform analysis.

Advantageous Effects of Invention

According to the invention, an automatic analyzer with no need to control a residual amount of a quality control sample can be provided.

BRIEF DESCRIPTION OF DRAWINGS

FIG. 3 is a view showing a flow of processing according to Embodiment 2.

DESCRIPTION OF EMBODIMENTS

Hereinafter, embodiments of an automatic analyzer according to the invention will be described with reference to the accompanying drawings.

Embodiment 1

Figure 1:
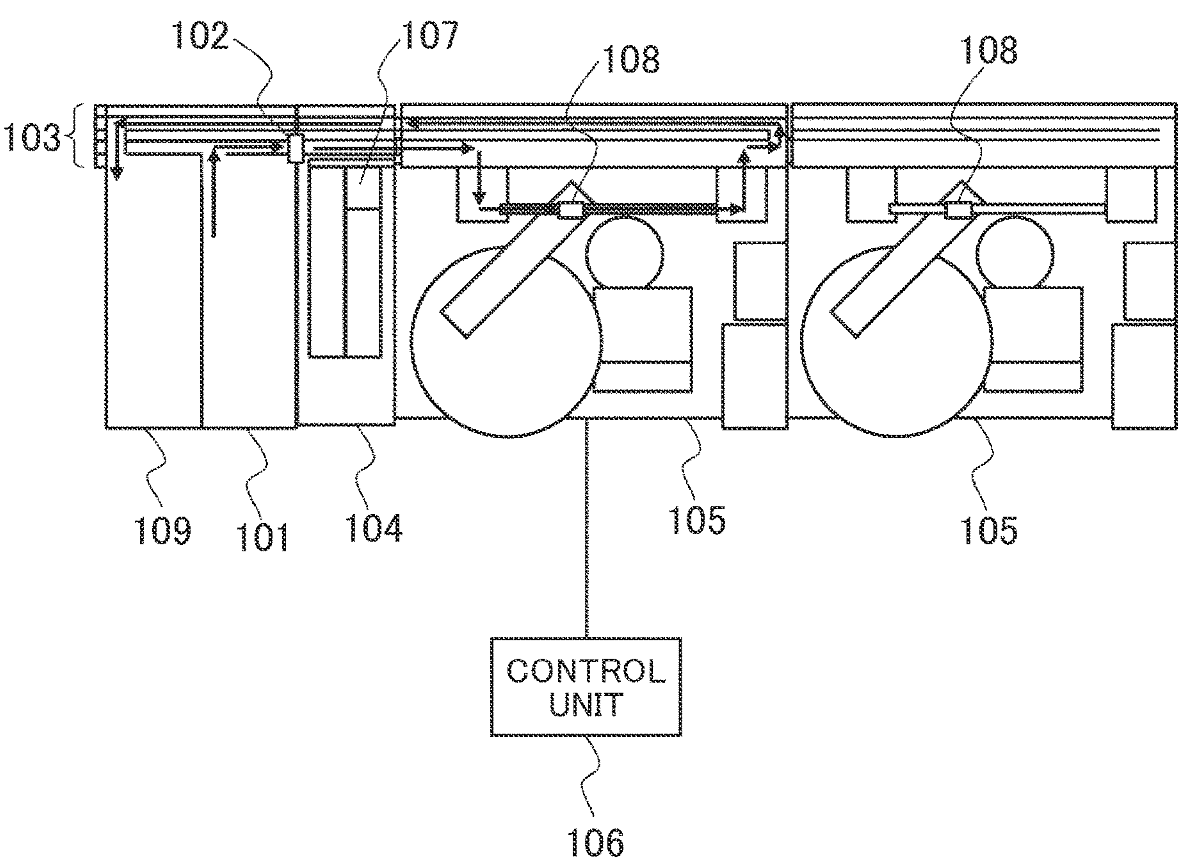
FIG. 1 is a view showing a structural example of an automatic analyzer.

A configuration example of an automatic analyzer will be described with reference to FIG. 1. The automatic analyzer includes an input unit 101, an ID reader 102, a conveyer line 103, a standby unit 104, analysis units 105, a collection unit 109, and a control unit 106. A plurality of analysis units 105 are provided. Hereinafter, each unit will be described.

The input unit 101 receives a container including a specimen and a quality control sample. The container including the specimen and the quality control sample is placed on a holder that holds a single container or a rack that holds a plurality of containers, and is put into the input unit 101. The rack or the holder put into the input unit 101 is conveyed to the ID reader 102, the standby unit 104, the analysis unit 105, and the collection unit 109 by the conveyer line 103.

The ID reader 102 is a device that reads ID that is an identifier attached to the container or the rack, and is, for example, a bar code reader or an RFID reader. A measurement item set for the specimen and the quality control sample is assigned to the ID read by the ID reader 102.

In the standby unit 104, a container having ID before the measurement item is assigned and a container having ID in which the assigned measurement item is not completed are in a standby state. Further, the standby unit 104 includes a cooling box 107 in which a container including a specimen and a quality control sample requiring cold-insulating are stored. The container in the standby state in the standby unit 104 is held by the rack or the holder.

The analysis unit 105 executes analysis on the specimen and the quality control sample based on the measurement item. Each of the analysis units 105 includes a dispensing probe 108 for dispensing the specimen and the quality control sample from the container held by the rack or the holder conveyed by the conveyer line 103. The dispensing probe 108 may be provided with a liquid surface detecting mechanism.

The rack or the holder holding the container into which the specimen and the quality control sample are dispensed is conveyed to the standby unit 104 or the collection unit 109 by the conveyer line 103. A rack or a holder holding the container having the ID in which the assigned measurement item is not completed is conveyed to the standby unit 104, and a rack or a holder holding only the container having the ID in which the assigned measurement item is completed is conveyed to the collection unit 109. The collection unit 109 collects the container held by the conveyed rack or holder.

The control unit 106 is a device that controls each unit in the automatic analyzer and executes processing related to the analysis, and is, for example, a computer. In the control unit 106, the measurement item for the specimen and the quality control sample is set by an operator. The set measurement item is assigned to the ID read by the ID reader 102. Further, a conveyance destination of the container having the read ID is selected based on the set measurement item.

Figure 2:
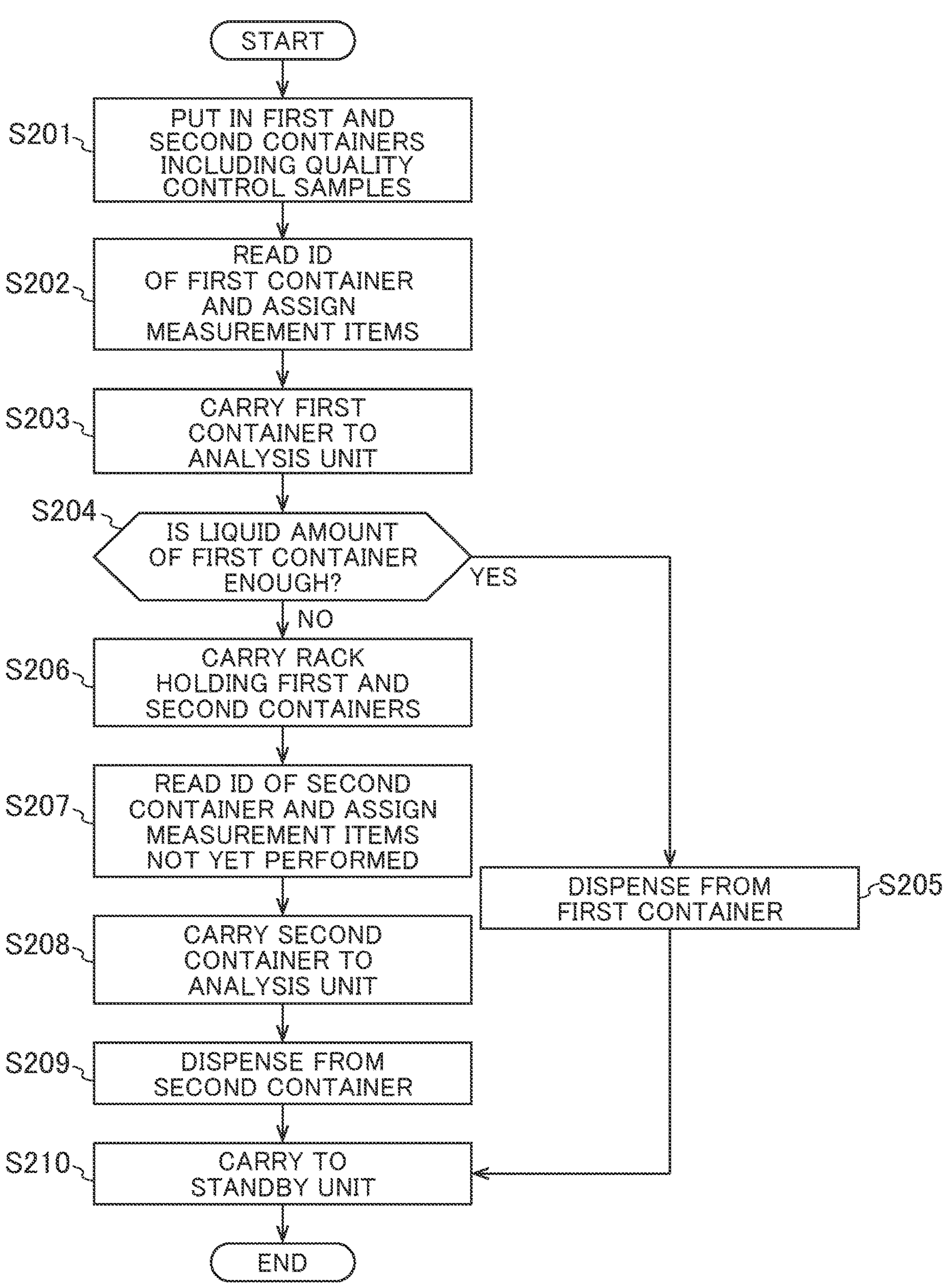
FIG. 2 is a view showing a flow of processing according to Embodiment 1.

When the measurement item for maintaining an analysis precision of the automatic analyzer is executed, when a liquid amount of the quality control sample included in the container is not enough, the measurement item cannot be executed, and an operation of the automatic analyzer is stopped in some cases. In Embodiment 1, a flow of processing shown in FIG. 2 is executed to prevent the operation of the automatic analyzer from being stopped while the measurement item for maintaining the analysis precision cannot be executed.

The flow of the processing executed in Embodiment 1 will be described for each step with reference to FIG. 2.

(S201)

A first container and a second container including the quality control sample are put into the input unit 101 in a state of being held in the same rack. The ID is attached to each of the first container and the second container. The rack put into the input unit 101 is conveyed to the ID reader 102 by the conveyer line 103.

(S202)

The ID reader 102 reads the ID of the first container held in the rack. The read ID is transmitted to the control unit 106, and the measurement item set for the quality control sample is assigned. Further, the control unit 106 selects, based on the assigned measurement item, a conveyance destination of the rack holding the first container from the plurality of analysis units 105.

(S203)

The control unit 106 conveys the rack holding the first container and the second container to the analysis unit 105 which is the conveyance destination selected in S202.

(S204)

The analysis unit 105 determines whether a liquid amount of the quality control sample included in the first container is enough. For the determination of the liquid amount, for example, the liquid surface detecting mechanism provided in the dispensing probe 108 is used, and a liquid amount measured by the liquid surface detecting mechanism is compared with a predetermined threshold. When the dispensing probe 108 is provided with the liquid surface detecting mechanism, the liquid amount is measured following a dispensing operation performed by the dispensing probe 108, and thus a time required for dispensing can be shortened. The liquid amount of the quality control sample included in the first container is not limited to being measured by the liquid surface detecting mechanism provided in the dispensing probe 108, and may be measured by another measurement device. If the liquid amount is equal to or greater than the threshold, that is, is enough, the processing proceeds to S205, and if the liquid amount is not enough, the processing proceeds to S206.

(S205)

In the analysis unit 105, the quality control sample included in the first container is dispensed by the dispensing probe 108, and the measurement item assigned to the ID of the first container is executed. When the assigned measurement item is executed, the processing proceeds to S210.

(S206)

The control unit 106 conveys the rack holding the first container and the second container to the ID reader 102 without executing the measurement item assigned to the ID of the first container.

(S207)

The ID reader 102 reads the ID of the second container held in the rack. The read ID is transmitted to the control unit 106, and a measurement item not yet executed in the first container is assigned thereto. Further, the control unit 106 sets the conveyance destination selected in S202 for the ID of the second container.

(S208)

The control unit 106 conveys the rack holding the first container and the second container to the analysis unit 105 which is the conveyance destination set in S207. While the processing from S206 to S208 is executed, the measurement item for the specimen other than the quality control sample is executed in the analysis unit 105.

(S209)

In the analysis unit 105, the quality control sample included in the second container is dispensed by the dispensing probe 108, and the measurement item assigned to the ID of the second container is executed.

(S210)

The control unit 106 conveys the rack holding the first container and the second container to the standby unit 104.

According to the flow of the processing described above, a need for controlling the residual amount of the quality control sample can be eliminated. That is, when the liquid amount of the quality control sample included in the first container is enough, the measurement item for maintaining the analysis precision is executed by using the first container, and even when the liquid amount thereof is not enough, the measurement item is executed by using the second container including the quality control sample. As a result, it is possible to prevent a situation where the measurement item for maintaining the analysis precision cannot be executed and the operation of the automatic analyzer is stopped because the liquid amount of the quality control sample is not enough.

During a period from when the liquid amount of the quality control sample is determined to be not enough in S204 to when the measurement item for maintaining the analysis precision is executed by using the second container in S209, the specimen other than the quality control sample is analyzed. Accordingly, a processing capacity of the automatic analyzer, that is, the number of specimens to be analyzed per unit time by the automatic analyzer is maintained.

Further, when it is determined in S204 that the liquid amount of the quality control sample included in the first container is not enough, a message prompting the operator to put a new container including the quality control sample may be notified. By inputting a new container by the operator according to the message, it is also possible to prevent the situation where the measurement item for maintaining the analysis precision cannot be executed and the operation of the automatic analyzer is stopped even when the liquid amount of the quality control sample included in the second container is not enough.

Embodiment 2

In Embodiment 1, a case is described where the first container and the second container including the quality control sample are held in the same rack. In Embodiment 2, a case will be described where a first container and a second container are held in individual racks. A configuration of an automatic analyzer according to Embodiment 2 is the same as that according to Embodiment 1, and description thereof is omitted.

A flow of processing executed in Embodiment 2 will be described for each step with reference to FIG. 3. Description of processing common to Embodiment 1 is simplified.

(S301)

The first container and the second container including a quality control sample are put into the input unit 101 in a state of being held in individual racks. ID is attached to each of the first container and the second container. The racks put into the input unit 101 are moved to the conveyer line 103, the rack of the first container is conveyed to the ID reader 102, and the rack of the second container is conveyed to the cooling box 107 of the standby unit 104. Since the second container is stored in the cooling box 107, a change in a concentration of the quality control sample can be prevented.

(S302)

Similar to S202, the ID of the first container is read by the ID reader 102, a measurement item set for the quality control sample is assigned to the read ID, and a conveyance destination of the rack holding the first container is selected from the plurality of analysis units 105.

(S303)

Similar to S203, the rack holding the first container is conveyed to the analysis unit 105 which is the conveyance destination selected in S302.

(S304)

Similar to S204, it is determined whether a liquid amount of the quality control sample included in the first container is enough. If the liquid amount is enough, the processing proceeds to S305, and if the liquid amount is not enough, the processing proceeds to S306.

(S305)

Similar to S205, the quality control sample included in the first container is dispensed by the dispensing probe 108, and the measurement item assigned to the ID of the first container is executed.

(S306)

The control unit 106 conveys the rack holding the first container to the standby unit 104 without executing the measurement item assigned to the ID of the first container, and conveys the rack holding the second container including the quality control sample from the cooling box 107 to the ID reader 102.

(S307)

Similar to S207, the ID of the second container is read by the ID reader 102, a measurement item not yet executed in the first container is assigned to the ID of the second container, and the conveyance destination selected in S302 is set for the ID of the second container.

(S308)

The control unit 106 conveys the rack holding the second container to the analysis unit 105 which is the conveyance destination set in S307. While the processing from S306 to S308 is executed, the measurement item for the specimen other than the quality control sample is executed in the analysis unit 105.

(S309)

Similar to S209, the quality control sample included in the second container is dispensed by the dispensing probe 108, and the measurement item assigned to the ID of the second container is executed.

(S310)

The control unit 106 conveys the rack holding the first container or the rack holding the second container to the standby unit 104.

According to the flow of the processing described above, a need for controlling a residual amount of the quality control sample can be eliminated. That is, when the liquid amount of the quality control sample included in the first container is enough, the measurement item for maintaining the analysis precision is executed by using the first container, and even when the liquid amount thereof is not enough, the measurement item is executed by using the second container including the quality control sample. As a result, it is possible to prevent a situation where the measurement item for maintaining the analysis precision cannot be executed and the operation of the automatic analyzer is stopped because the liquid amount of the quality control sample is not enough.

Further, in Embodiment 2, since the rack holding the second container is conveyed toward the analysis unit 105 immediately after it is determined that the liquid amount of the quality control sample included in the first container is not enough, a time for executing the measurement item for maintaining the analysis precision can be shorter than that in Embodiment 1. That is, compared to Embodiment 1 in which the rack holding the second container is conveyed from the analysis unit 105 to the analysis unit 105 again via the ID reader 102, in Embodiment 2, it is possible to shorten a time in which the rack holding the second container is conveyed from the cooling box 107 to the analysis unit 105 via the ID reader 102 because a conveyance distance is short. In Embodiment 1, since there is no need to operate the cooling box 107, the control can be simplified as compared with Embodiment 2.

The embodiments according to the invention are described above. The invention is not limited to the embodiments described above, and elements may be modified without departing from the scope of the invention. A plurality of the elements disclosed in the embodiments may be combined as appropriate. Further, some elements may be omitted from all the elements described in the embodiments.

REFERENCE SIGNS LIST

101: input unit
102: ID reader
103: conveyer line
104: standby unit
105: analysis unit
106: control unit
107: cooling box
108: dispensing probe
109: collection unit

The invention claimed is:

1. An automatic analyzer comprising:

an input unit configured to receive a container including a specimen and a quality control sample;

an ID reader configured to read an ID attached to the container;

a control unit configured to assign measurement items to the ID;

wherein the measurement items comprise at least a set measurement item, a specimen measurement item, a specimen-control measurement item, performed measurement items, and unperformed measurement items;

wherein the set measurement item is configured to be a predetermined volume of the quality control sample in the container, and the set measurement item is further configured to be a minimum volume of the quality control sample required to analyze a volume of the specimen within the container;

wherein the specimen measurement item is configured to be a volume of specimen assigned by the control unit to be analyzed within the container; and wherein the specimen-control measurement item is configured to be the volume of a mixed solution of specimen and quality control sample assigned by the control unit to be analyzed within the container; and an analysis unit configured to dispense the specimen and the quality control sample from the container and perform analysis based on the measurement items assigned by the control unit, wherein the control unit is configured to control the input unit and the analysis unit, and is configured to perform operations comprising:

determining the specimen-control measurement item in a first container including determining if the quality control sample is configured to contain an insufficient volume of the quality control sample;

assigning the unperformed measurement items and the performed measurement items, wherein the control unit is configured to assign unperformed measurement items not yet performed, to the measurement items assigned to an ID of the first container, and to an ID of a second container when the quality control sample is at an insufficient volume, wherein the second container includes the set measurement item necessary to complete unperformed measurement items; and transporting the second container, wherein the control unit is configured to cause the second container to be transported to the analysis unit, and wherein the control unit is further configured to control the analysis unit to perform analysis of the unperformed measurement items.

2. The automatic analyzer according to claim 1, wherein the first container and the second container are held in a same rack, and based on determining that the volume of liquid in the first container is insufficient, the control unit is configured to convey the rack to the ID reader and assign the unperformed measurement items, of the measurement items assigned to the ID of the first container, to the ID of the second container.

3. The automatic analyzer according to claim 2, wherein while the rack is conveyed to the ID reader, the control unit is configured to control the analysis unit to analyze the measurement items other than the measurement items of the quality control sample.

4. The automatic analyzer according to claim 1, wherein the first container and the second container are held in individual racks, and based on determining that the volume of liquid in the first container is insufficient, the control unit is configured to convey the rack holding the second container to the ID reader and assign the unperformed measurement items, of the measurement items assigned to the ID of the first container, to the ID of the second container.

5. The automatic analyzer according to claim 4, wherein the rack holding the second container is kept in a cooling box for cold-insulating the quality control sample contained in the second container.

6. The automatic analyzer according to claim 1, wherein the analysis unit has a dispensing probe which dispenses the specimen and the quality control sample, and the dispensing probe is provided with a liquid surface detecting mechanism.

* * * * *